United States Patent [19]

Suga et al.

[11] Patent Number: 4,902,761
[45] Date of Patent: Feb. 20, 1990

[54] METHOD FOR PRODUCING AN OLEFIN POLYMER

[75] Inventors: Yoshinori Suga, Machida; Eiji Tanaka, Kawasaki; Yasuo Maruyama, Tokyo, all of Japan

[73] Assignee: Mitsubishi Kasei Corporation, Tokyo, Japan

[21] Appl. No.: 122,040

[22] Filed: Nov. 17, 1987

[30] Foreign Application Priority Data

Nov. 20, 1986 [JP] Japan .................. 61-277361
May 8, 1987 [JP] Japan .................. 62-111994

[51] Int. Cl.$^4$ .................. C08F 4/64; C08F 10/00
[52] U.S. Cl. .................. 526/119; 502/127; 502/125; 526/124; 526/351; 526/904; 526/909
[58] Field of Search .................. 526/119, 124

[56] References Cited

U.S. PATENT DOCUMENTS

| | | | |
|---|---|---|---|
| 3,135,809 | 6/1964 | Bosmajian | 260/650 |
| 4,429,087 | 1/1984 | Capphew | 526/119 |
| 4,472,521 | 9/1984 | Band | 526/125 |
| 4,710,482 | 12/1987 | Job | 526/125 |

FOREIGN PATENT DOCUMENTS

2111066  6/1983  United Kingdom ............. 526/125

Primary Examiner—Edward J. Smith
Attorney, Agent, or Firm—Oblon, Spivak, McClelland, Maier & Neustadt

[57] ABSTRACT

A method for producing an olefin polymer, which comprises polymerizing or copolymerizing olefins in the presence of a catalyst comprising:

(A) a solid catalyst component obtained by thermally reacting (a$_1$) a magnesium compound of the formula Mg(OR$^1$)$_n$(OR$^2$)$_{2-n}$ wherein each of R$^1$ and R$^2$ which may be the same or different is an alkyl group, an aryl group or an aralkyl group, and n is $2 \geq n \geq 0$, (a$_2$) a titanium compound of the formula Ti(OR$^3$)$_4$ wherein R$^3$ is an alkyl group, an aryl group or an aralkyl group and (a$_3$) a silicon compound of the formula Si(OR$^4$)$_4$ wherein R$^4$ is an alkyl group, an aryl group or an aralkyl group and contacting and treating (a) the resulting thermal reaction product with (b) a halogen-containing titanium compound and (c) an electron donative compound, and (B) an organometallic compound of a metal of Groups I–III of the Periodic Table.

28 Claims, No Drawings

METHOD FOR PRODUCING AN OLEFIN POLYMER

The present invention relates to a method for producing an olefin polymer by means of a novel solid catalyst component. Particularly, the present invention relates to a method for producing a polymer of an α-olefin such as ethylene, propylene, butene-1, 4-methylpentene-1 or 3-methylbutene-1 by means of a catalyst comprising a novel carrier-supported catalyst component, an organometallic compound of a metal of Groups I–III and, if necessary, an electron donative compound, which is capable of providing a polymer having excellent stereo regularity and granularity with high polymerization activities. More particulary, the present invention relates to a method for producing a polymer having high stereo regularity and excellent granularity with high polymerization activities especially from an α-olefin having at least 3 carbon atoms.

Heretofore, a number of proposals have been made for producing catalysts supported on carriers, which are capable of providing polymers having high stereo regularity with high polymerization activities for α-olefins having at least 3 carbon atoms However, most of them were not fully satisfactory with respect to the polymerization activities or stereo regularity, and a further improvement has been desired. Further, the granularity of the polymers thereby obtained was inadequate, and a further improvement has been desired.

Granularity is an extremely important factor for slurry polymerization or vapor phase polymerization. If the granularity is poor, there will be troubles such as adhesion in the reactor, difficulty in the withdrawal of the polymer or clogging of the pipeline.

For example, Japanese Unexamined Patent Publications No. 98076/1977 and No. 2580/1978 disclose a method wherein a reaction product obtained by contacting three components of a magnesium alkoxide, a titanium halide and an electron donative compound is used as a catalyst component. However, the polymerization activity, the stereo regularity and the granularity of the resulting polymer were all inadequate.

Japanese Unexamined Patent Publication No. 120711/1981 discloses a method wherein a titanium tetralkoxide is used in addition to the above-mentioned three components. Namely, a magnesium alkoxide is treated by a titanium tetra-alkoxide in heptane, and the treated solid thereby obtained is treated with an organic acid ester and a titanium halide. However, in this method, the polymerization activity (polymer yield per 1 g of titanium per one hour per 1 kg/cm$^2$ of propylene pressure) was at best 10000 g.PP/g.Ti.kg/cm$^2$ppy.hr, and the isotactic index was 94% at the highest and the bulk density was about 0.30 g/cc. Thus, this method did not show sufficiently high performance.

Further, Japanese Unexamined Patent Publication No. 120603/1984 discloses a method wherein a magnesium alkoxide and/or a manganese alkoxide is contacted with a titanium tetra-alkoxide to form a liquid, the liquid is reacted with a fluid containing a halogenating agent and treated with an electron donative compound to form a treated solid, and the solid is after-treated with a transition metal halide. This method is intended to produce a catalyst component which is capable of providing a polyolefin having a narrow and high particle diameter distribution and containing a minimum amount of a fine particle component in the polymer. With respect to the particle size distribution, there are many large particles, and it can hardly be said that the distribution is narrow, although a substantial decrease of fine particles is observed. However, the effect for improvement is not sufficiently high particularly for the stereo regularity, and the isotactic index was less than 90%.

As other references, Japanese Unexamined Patent Publications No. 34103/1982, No. 127708/1983, No. 81210/1985, No. 81211/1985, No. 170603/1985, No. 192709/1985, No. 211308/1986, No. 211310/1986, No. 159806/1982 and No. 182806/1984 disclose the use of magnesium alkoxides; Japanese Unexamined Patent Publications No. 206408/1984, No. 62907/1980, No. 30406/1981, No. 131205/1982 and No. 34084/1985 disclose the use of titanium alkoxides; Japanese Unexamined Patent Publications No. 166205/1981, No. 190004/1982, No. 200407/1982, No. 32804/1985, No. 248705/1985, No. 183706/1983, No. 6111/1971, No. 32081/1972, No. 3184/1979, No. 96613/1983, No. 66178/1973, No. 16393/1979 and No. 18405/1987 disclose a combination of a magnesium alkoxide and a titanium alkoxide; Japanese Unexamined Patent Publications No. 151704/1981, No. 155205/1981, No. 262806/1985, No. 296006/1986 and No. 508/1987 disclose the use of silicon compounds; Japanese Unexamined Patent Publications No. 151691/1977, No. 152810/1981 and No. 83006/1983 disclose other Mg-supporting catalysts.

The present inventors have previously proposed in Japanese Patent Application No. 122336/1987 a method for preparing a catalyst component having excellent stereo regularity and granularity with high polymerization activities by treating a magnesium dialkoxide with an electron donative compound, a silicon tetra-alkoxide and a titanium compound such as titanium tetrachloride. However, a further improvement has been desired particularly with respect to the granularity.

The present inventors have conducted extensive research for a method for preparing a solid catalyst component which is capable of providing a polymer having further improved granularity while maintaining the high polymerization activity and high stereo regularity of the above catalyst system, and as a result, have arrived at the present invention.

The present invention provides a method for producing an olefin polymer, which comprises polymerizing or copolymerizing an olefin in the presence of a catalyst comprising (A) a solid catalyst component obtained by thermally reacting (a$_1$) a magnesium compound of the formula Mg(OR$^1$)$_n$(OR$^2$)$_{2-n}$ wherein each of R$^1$ and R$^2$ which may be the same or different is an alkyl group, an aryl group or an aralkyl group, and n is $2 \geq n \geq 0$, (a$_2$) a titanium compound of the formula Ti(OR$^3$)$_4$ wherein R$^3$ is an alkyl group, an aryl group or an aralkyl group and (a$_3$) a silicon compound of the formula Si(OR$^4$)$_4$ wherein R$^4$ is an alkyl group, an aryl group or an aralkyl group and, if necessary, (a$_4$) a compound of the formula R$^5$OH wherein R$^5$ is an alkyl group, an aryl group or an aralkyl group and contacting and treating (a) the resulting thermal reaction product with (b) a halogen-containing titanium compound and (c) an electron donative compound, and (B) an organic metal compound of a metal of Groups I–III of the Periodic Table, and, if necessary, (C) an electron donative compound.

Now, the present invention will be described in detail with reference to the preferred embodiments.

Especially, the present invention provides a method for producing an olefin polymer, which comprises polymerizing or copolymerizing olefins by means of a catalyst comprising the solid catalyst component (A) and the organic metal compound (B) of a metal of Groups I–III of the Periodic Table, as essential components and having optionally an electron donative compound (C) combined thereto, wherein the solid catalyst component (A) is obtained by contacting and treating a thermal reaction product (a) of the magnesium compound (a₁) of the formula $Mg(OR^1)_n(OR^2)_{2-n}$, the titanium compound (a₂) of the formula $Ti(OR^3)_4$, the silicon compound (a₃) of the formula $Si(OR^4)_4$ and, if necessary, the compound (a₄) of the formula $R^5OH$, with a halogen-containing titanium compound (b) and an electron donative compound (c).

Specific examples of the magnesium compound (a₁) of the formula $Mg(OR^1)_n(OR^2)_{2-n}$ to be used in the present invention, include a dialkoxy magnesium, a diaryloxy magnesium, a diaralkyloxy magnesium and an alkoxyaryloxy magnesium, such as $Mg(OCH_3)_2$, $Mg(OC_2H_5)_2$, $Mg(OC_3H_7)_2$, $Mg(OC_4H_9)_2$, $Mg(OC_6H_5)_2$, $Mg(OCH_2C_6H_5)_2$, $Mg(OC_2H_5)(OC_4H_9)$, $Mg(OC_6H_5)(OC_4H_9)$, $Mg(OC_2H_5)(OC_6H_5)$ and $Mg(OC_6H_4CH_3)_2$. These compounds may be used alone or in combination as a mixture.

The titanium compound (a₂) of the formula $Ti(OR^3)_4$ includes $Ti(OCH_3)_4$, $Ti(OC_2H_5)_4$, $Ti(OC_3H_7)_4$, $Ti(OC_4H_9)_4$, $Ti(OC_6H_5)_4$ and $Ti(OCH_2C_6H_5)_4$. These compounds may be used alone or in combination as a mixture.

The silicon compound (a₃) of the formula $Si(OR^4)_4$ includes tetramethoxysilane, tetraethoxysilane, tetrapropoxysilane, tetrabutoxysilane, tetra(2-ethylhexoxy)silane, tetraphenoxysilane and tetra(p-methylphenoxy)silane. These compounds may be used alone or in combination as a mixture.

The compound (a₄) of the formula $R^5OH$ includes alcohols such as ethanol, isopropanol, propanol, butanol, isobutanol, hexanol, octanol, 2-ethylhexanol and benzyl alcohol; and phenols such as phenol, cresol, xylenol and butylphenol.

Among them, at least one of the magnesium compound, the titanium compound, the silicon compound and the compound of the formula $R^5OH$ preferably contains an aryloxy group.

For the preparation of the reaction product (a) from three or four compounds i.e. the magnesium compound (a₁), the titanium compound (a₂) and the silicon compound (a₃) and, if necessary, the compound (a₄) of the formula $R^5OH$, there may be employed a method wherein compounds (a₁), (a₂), (a₃) and, if necessary, (a₄) are simultaneously contacted and reacted, a method wherein compounds (a₁), (a₂) and (a₃) are reacted, and then compound (a₄) is reacted thereto, a method wherein compounds (a₁) and (a₂) are reacted, and then compound (a₃) and, if necessary, compound (a₄) are reacted thereto, a method wherein compounds (a₁), (a₂) and, if necessary, (a₄) are reacted, and then, compound (a₃) is reacted thereto, or a method wherein compounds (a₁), (a₃) and, if necessary, (a₄) are reacted, and then compound (a₂) is reacted thereto. An inert hydrocarbon solvent such as hexane, heptane, pentane, butane, toluene or xylene may be present during the reaction. The reaction temperature is usually from 60° to 200° C., preferably from 100° to 150° C. The reaction time is usually from 0.5 to 4 hours. The respective components are used usually in the following molar ratios:

| | |
|---|---|
| $Mg(OR^1)_n(OR^2)_{2-n}$ | 1 |
| $Ti(OR^3)_4$ | 0.05–4, preferably 0.2–1 |
| $Si(OR^4)_4$ | 0.1–5, preferably 0.2–2 |
| $R^5OH$ | 0.1–5, preferably 1–3 |

The thermal reaction product (a) of the magnesium compound (a₁), the titanium compound (a₂) and the silicon compound (a₃) and, if necessary, the compound (a₄) of the formula $R^5OH$, may be obtained in a liquid form depending upon the proportions of the three or four components (a₁), (a₂) and (a₃) and, if necessary, (a₄) However, in many cases, good results are obtained when the thermal reaction product is used in the form of a slurry containing the solid product.

When it is in a liquid form, a homogeneous liquid system will be obtained during the reaction with the titanium halide as will be described hereinafter, but then subsequent formation of a solid component tends to be difficult.

In the present invention, the thermal reaction product (a) thus obtained is contacted and treated with a halogen-containing titanium compound (b) and an electron donative compound (c) in the presence or absence of an inert hydrocarbon solvent such as hexane, heptane, butane or toluene to obtain a solid catalyst component (A).

The halogen-containing titanium compound (b) used here includes titanium tetrachloride, titanium tetrabromide, titanium tetraiodide and a titanium halide-alcoholate compound. Among them, titanium tetrachloride and the titanium halide-alcoholate compound are preferred.

The electron donative compound (c) includes a phosphorus-containing compound, an oxygen-containing compound, a sulfur-containing compound and a nitrogen-containing compound. Among them, an oxygen-containing compound may preferably be employed.

The oxygen-containing compound includes, for example, compounds of the formulas:

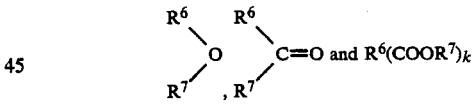

wherein each of $R^6$ and $R^7$ is a hydrocarbon group which may be substituted by an alkoxy group, or $R^6$ and $R^7$ may be bonded to each other to form a cyclic group, and k is an integer of from 1 to 3. Specifically, there may be mentioned ethers such as diethyl ether, dipropyl ether, diethylene glycol, polypropylene glycol, ethylene oxide, propylene oxide and furan; ketones such as acetone, diethyl ketone, methyl ethyl ketone, methyl isobutyl ketone and phenyl propyl ketone; carboxylic acid esters such as ethyl acetate, methyl propionate, ethyl acrylate, ethyl oleate, ethyl stearate, ethyl phenylacetate, methyl benzoate, ethyl benzoate, propyl benzoate, butyl benzoate, methyl toluate, ethyl toluate, propyl toluate, butyl toluate, methyl ethylbenzoate, ethyl ethylbenzoate, ethyl xylenecarboxylate, methyl anisate, ethyl anisate, methyl ethoxybenzoate, ethyl ethoxybenzoate and ethyl cinnamate; cyclic esters such as γ-butyrolactone; and silicon-containing carboxylic acid esters such as β-trimethoxysilylethyl benzoate. Among them, carboxylic acid esters are preferred. Particularly preferred are aromatic carboxylic acid esters.

In the method of the present invention, components (a), (b) and (c) may be contacted and treated by a method wherein component (a) is treated with components (b) and (c), a method wherein components (a) and (b) are first contacted, and then treated with component (c), or a method wherein components (a) and (c) are first contacted, and then treated with component (b). Otherwise, it is possible that the reaction for preparation of the reaction product (a) is conducted in the presence of component (c), and the reaction product is subsequently treated with component (b). Further, it is preferred that the treatment with components (b) and (c) is repeated at least twice.

After the treatment, the product is washed with an inert hydrocarbon solvent to remove substances which are soluble in the solvent, to obtain a solid catalyst component (A).

The amounts of components (b) and (c) to be used in a single treating operation during the process for the preparation of the catalyst are usually as follows, as represented by the molar ratios relative to one mol of the magnesium compound in component (a):

| | |
|---|---|
| Halogen-containing titanium compound (b) | 0.1–100, preferably 1–40 |
| Electron donative compound (c) | 0.01–10, preferably 0.1–1 |

The amounts of the respective components are adjusted preferably to bring the titanium content in the solid catalyst component (A) to a level of from 0.1 to 10% by weight, more preferably from 0.5 to 5% by weight.

The contacting and treating temperature is usually within a range of from $-70°$ to $200°$ C., preferably from $-30°$ to $150°$ C. Specifically, for example, when components (a) and (b) are first contacted to each other, and then component (c) is contacted and treated therewith, it is preferred that components (a) and (b) are contacted at a temperature of from $-70°$ to $50°$ C., more preferably from $-30°$ to $30°$ C., and then component (c) is contacted and treated therewith at a temperature of from $50°$ to $200°$ C., more preferably from $70°$ to $150°$ C. When components (a), (b) and (c) are simultaneously contacted, good results can be obtained by contacting them firstly at a temperature of from $-70°$ to $50°$ C., preferably from $-30°$ to $30°$ C., and then treating them at a higher temperature of from $50°$ to $200°$ C., preferably from $70°$ to $150°$ C.

By controlling the contacting temperature to a low level as mentioned above, the entire system can readily be brought to a homogeneous liquid state once during the contact and treatment of components (a) and (b), if necessary, together with component (c), and the homogeneous liquid thus formed is heated to precipitate a solid, whereby a solid catalyst component having excellent granularity will be obtained.

The treatment may be conducted in the presence or absence of an inert solvent, and the treating time is usually from 0.5 to 6 hours.

Then, a polyolefin is produced by polymerizing or copolymerizing an olefin by means of a catalyst system obtained by mixing the solid catalyst component (A) thus obtained with an organic metal compound (B) of a metal of Groups I–III of the periodic Table, if necessary, together with an electron donative compound (C).

The organic metal compound (B) of a metal of Groups I–III of the Periodic Table to be used in this catalyst system, may preferably be a compound represented by the formula $AlR^8X_{3-m}$ wherein $R^8$ is a hydrocarbon group, particularly an aliphatic hydrocarbon group, having from 1 to 20 carbon atoms, X is a halogn atom, and m is a number of 2 to 3. Specific examples of this organoaluminum compound include triethylaluminum, tripropylaluminum, triisobutylaluminum, trihexylaluminum, trioctylaluminum, monovinyldiethylaluminum and diethylaluminum monochloride. A trialkylaluminum is preferably empolyed.

The electron donative compound (C) may be component (c) used for the preparation of the solid catalyst component (A). It is preferably a carboxylic acid ester, more preferably an aromatic carboxylic acid ester.

With respect to the proportions of the components of the catalyst, the molar ratio of titanium in the catalyst component (A): the aluminum compound of the component (B): the electron donative compound of the component (C) is selected to be 1:3–500:0–100, preferably 1:20–200: 3–50.

The olefin to be polymerized or copolymerized may be ethylene, propylene, butene-1, 3-methylbutene-1 or 4-methylpentene-1. An α-olefin having at least 3 carbon atoms is preferred. Particularly preferred is propylene. The polymerization may be homopolymerization, or random or brock copolymerization. The polymerization reaction may be conducted in a slurry polymerization system by using, as a solvent, hexane, heptane, toluene, pentane, butane or a mixture thereof, or a liquefied form of the α-olefin to be polymerized, or in a vapor phase polymerization system where the polymerization is conducted in a vapor phase.

The temperature is usually within a range of from $50°$ to $100°$ C., preferably from $60°$ to $90°$ C. The pressure is not critical and is usually selected within a range of from atmospheric pressure to 100 atm.

Further, hydrogen may be present as molecular weight controlling agent in the polymerization system, whereby the melt flow index (MFI as measured by ASTM D-1238) can readily be changed.

Other techniques commonly employed for the polymerization or copolymerization of an α-olefin, may be applied to the method of the present invention. For instance, the α-olefin may be prepolymerized by using the three components (A), (B) and (C) or the two components (A) and (B) of the above-mentioned catalyst, and then the α-olefin is subjected to the main polymerization at a temperature higher than the temperature for the prepolymerization. In such a case, the amount of the prepolymerization is selected within a range of from about 0.1 to about 100 g per 1 g of the catalyst component (A), but an amount of from about 1 to about 3 g is usually sufficient. The prepolymerized catalyst components may be used for the main polymerization after being washed with an inert hydrocarbon solvent such as hexane, or as they are without being washed.

Now, the present invention will be described in further detail with reference to Examples. However, it should be understood that the present invention is by no means restricted to such specific Examples.

In the Examples, the polymerization activity (represented by K) is the amount (g) of the polymer produced per 1 hour per an α-olefin pressure of 1 kg/cm² and per 1 g of the solid catalyst component (A), and the catalyst efficiency (represented by CE) is the amount (g) of the polymer produced per 1 g of the solid catalyst component (A).

The isotactic index (represented by II) is the residual amount (% by weight) after the extraction with boiling n-heptane for 6 hours by means of an improved soxhlet extractor.

The bulk density (represented by $\rho B$ with a unit of g/cc) was measured in accordance with JIS (Japanese Industrial Standard) K-6721.

The melt flow index (represented by MFI) was measured in accordance with ASTM D-1238.

The particle size distribution of the polymer was measured by means of standard sieves manufactured by Mitamura Riken Inc.

EXAMPLE 1

(1) Preparation of catalyst component (A)

A 500 ml flask equipped with a stirrer and a thermometer, was thoroughly flushed with purified nitrogen. Under sealing with purified nitrogen, 5 g of commercially available $Mg(OC_2H_5)_2$ was introduced into the flask, and a toluene solution containing 7.4 g of $Ti(OC_4H_9)_4$ and 8.8 g of tetraphenoxysilane, was added thereto. The mixture was heated under stirring and reacted at 130° C. for 2 hours to obtain a reaction product (a) as a yellow slurry.

After an addition of 87 ml of purified toluene, the reaction product was cooled to $-20°$ C., and 41 g of $TiCl_4$ was added thereto at $-20°$ C. After the addition, the entire system was in the form of a homogeneous solution. Then, the temperature was gradually raised, and after the temperature reached at 80° C., 1.3 g of ethyl benzoate was added thereto, and the mixture was maintained at 80° C. for 1 hour. Then, the reaction mixture was washed with purified toluene to obtain a solid product.

Then, 82 g of $TiCl_4$ and 1.3 g of ethyl benzoate were added to the product, and the mixture was treated at 80° C. for 2 hours for the formation of solid. Then, the product was thoroughly washed with purified toluene to obtain 4.8 g of a solid catalyst component. The amount of Ti supported thereon was 2.9% by weight.

(2) Polymerization of propylene

Into a 2 liter induction-stirring autoclave thoroughly flushed with purified argon, 1.0 mmol of triethylaluminum and 0.3 mmol of methyl p-methylbenzoate were introduced under an argon atmosphere at room temperature, and $H_2$ was introduced at room temperature to a level of 1.0 kg/cm$^2$. Then, 700 g of liquefied propylene was added thereto. After an addition of 15 mg of the above solid catalyst, the system was heated to 70° C., and polymerization was conducted for 1 hour. Thereafter, excess propylene was purged to obtain 383 g of powder polypropylene. The catalyst efficiency CE was 25500 g-PP/g-Cat and the polymerization activity K was 850. The bulk density $\rho B$ was 0.43 g/cc, II was 96.0%, and MFI was 4.8. The particle size distribution of the polymer thus obtained was very narrow. Namely, powder particles having a particle size of from 250 to 500 $\mu$m constituted 98% of the total powder, and the amount of fine powder of 100 $\mu$m or less was 0%.

EXAMPLE 2

(1) Preparation of catalyst component (A)

5 g of commercially available $Mg(OC_2H_5)_2$, 3.7 g of $Ti(OC_4H_9)_4$ and 6 g of tetra(2-ethylhexoxy)silane were reacted at 150° C. for 2 hours to obtain a reaction product (a).

Purified toluene was added to the reaction product (a), and 83 g of $TiCl_4$ was added thereto at 0° C. Then, the temperature was gradually raised, and 1.3 g of ethyl benzoate was added at 100° C. The mixture was maintained at 100° C. for 2 hours. The rest of the operation was conducted in the same manner as in Example 1 to obtain a solid catalyst component. The amount of Ti supported thereon was 2.7% by weight.

(2) Polymerization of propylene

Polymerization of propylene was conducted in the same manner as in Example 1(2), whereby the catalyst efficiency CE=28500 g-PP/g-Cat, the polymerization activity K=950, $\rho B$=0.39 g/cc, II=95.0% and MFI=5.7. The particle size distribution of the polymer was measured, whereby powder particles having a particle size of from 74 to 250 $\mu$m constituted 96% of the entire powder, and the amount of fine powder of 74 $\mu$m or less was 0.2%.

EXAMPLE 3

(1) Preparation of catalyst component (A)

5 g of commercially available $Mg(OC_2H_5)_2$, 3.7 g of $Ti(OC_4H_9)_4$ and 7 g of tetrabutoxysilane were reacted at 130° C. for 1 hour to obtain a reaction product (a). Purified toluene was added to the reaction product (a), and 83 g of $TiCl_4$ was added thereto at $-10°$ C. Then, the temperature was gradually raised, and 13 g of ethyl benzoate was added thereto at 100° C. The mixture was maintained at 100° C. for 2 hours. The rest of operation was conducted in the same manner as in Example 1 to obtain a solid catalyst component. The amount of Ti supported thereon was 2.5% by weight.

(2) Polymerization of propylene

Polymerization of propylene was conducted in the same manner as in Example 1(2), whereby the catalyst efficiency CE=22500 g-PP/g-Cat, the polymerization activity K=750, II=96.5%, $\rho B$=0.40 g/cc and MFI=2.7. The particle size distribution of the polymer was such that powder particles having a particle size of from 350 to 1000 $\mu$m constituted 90% of the total powder, and the amount of fine powder of 100 $\mu$m or less was 0.3%.

EXAMPLE 4

(1) Preparation of catalyst component (A)

10 In the same manner as in Example 1, 7.4 g of $Ti(OC_4H_9)_4$ was mixed to 5 g of commercially available $Mg(OC_2H_5)_2$, and the mixture was heated under stirring and reacted at 130° C. for 2 hours to obtain a liquid product. Then, 8.8 g of tetraphenoxysilane dissolved in toluene was added thereto, and the reaction was continued further at 130° C. After a while after the addition, the reaction system turned from a uniform solution to a slurry, whereby it was confirmed that a new solid product was formed by the addition of tetraphenoxysilane.

A solid catalyst component was prepared in the same manner as in Example 1 except that the entire amount of this slurry product was employed.

(2) Polymerization of propylene

Polymerization of propylene was conducted in the same manner as in Example 1(2), whereby the catalyst efficiency CE=25800 g-PP/g-Cat, the polymerization activity K=860, II=95.7%, $\rho B$=0.41 g/cc and MFI=6.5.

The particle size distribution of the polymer was such that powder particles having a particle size of from 177 to 500 $\mu$m constituted about 90% of the total, and the amount of fine powder of 100 $\mu$m or less was 0.5%.

EXAMPLE 5

Polymerization was conducted in the same manner as in Example 1(2) except that methyl anisate was employed instead of methyl p-ethylbenzoate, whereby the catalyst efficiency CE=21000 g-PP/g-Cat, the polymerization activity K=700, $\rho B$=0.44 g/cc, II=97.2% and MFI=3.6%.

The particle size distribution of the polymer thus obtained was substantially the same as in Example 1(2).

EXAMPLE 6

(1) Preparation of catalyst component (A)

9.2 g of Mg(OC$_6$H$_5$)$_2$, 7.4 g of Ti(OC$_4$H$_9$)$_4$ and 4.6 g of tetraethoxysilane were reacted at 130° C. for 2 hours to obtain a reaction product (a). The reaction product (a) was a yellow solid.

A solid catalyst component was prepared in the same manner as in Example 1(1) except that this reaction product (a) was employed.

(2) Polymerization of propylene

Polymerization of propylene was conducted in the same manner as in Example 1(2), whereby the catalyst efficiency CE=21000 g-PP/g-Cat, the polymerization activity K=700, II=97%, $\rho B$=0.42 g/cc and MFI=3.5.

The particle size distribution of the polymer thus obtained was very narrow such that powder particles having a particle size of from 250 to 500 $\mu$m constituted 96% of the total amount, and the amount of fine powder of 100 $\mu$m or less was 0.4%.

EXAMPLE 7

(1) Preparation of catalyst component (A)

A 500 ml flask equipped with a stirrer and a thermometer was thoroughly flushed with purified nitrogen. Under sealing with purified nitrogen, 5 g of commercially available Mg(OC$_2$H$_5$)$_2$ was introduced into the flask, and a toluene solution containing 7.4 g of Ti(OC$_4$H$_2$)$_4$, 4.6 g of tetraethoxysilane and 8.2 g of phenol was added thereto. The mixture was heated under stirring and reacted at 100° C. for 1 hour. The mixture was further reacted at 130° C. for 2 hours to obtain a reaction product (a) as a yellow solid slurry.

After the reaction, 87 ml of purified toluene was added to the reaction product, and the mixture was cooled to $-20$° C. Then, 25 g of TiCl$_4$ was added thereto at $-20$° C. After the addition, the entire system was a homogeneous solution. The temperature was gradually raised after the addition, and after the temperature reached to 80° C., 1.3 g of ethyl benzoate was added thereto. The mixture was maintained at 80° C. for 1 hour. Then, the product was washed with purified toluene to obtain a solid product.

Then, 82 g of TiCl$_4$ and 1.3 g of ethyl benzoate were added to the solid product thus obtained, and the solid product was treated at 80° C. for 1 hour. Then, the product was washed with purified toluene at room temperature to obtain 5.0 g of a solid catalyst component. The Ti content thereof was 2.7% by weight.

(2) Polymerization of propylene

Polymerization of propylene was conducted in the same manner as in Example 1(2) to obtain 293 g of powder polypropylene.

The catalyst efficiency CE was 19500 g-PP/g-Cat, and the polymerization activity K was 650. The bulk density $\rho B$ of the polymer obtained was 0.42 g/cc, II was 97.0% and MFI was 4.5.

The particle size distribution of the polymer was very narrow such that the polymer having a particle size of from 250 to 500 $\mu$m constituted 97% of the total amount, and the amount of fine powder of 100 $\mu$m or less was 0.5%.

EXAMPLE 8

In the same manner as in Example 7(1), 5 g of commercially available Mg(OC$_2$H$_5$)$_2$, 7.4 g of Ti(OC$_4$H$_9$)$_4$ and 4.6 g of tetraethoxysilane were mixed, heated under stirring and reacted at 130° C. for 1 hour. Then, the temperature was lowered to 100° C., and a toluene solution containing 8.2 g of phenol was added thereto. After the addition, the temperature was again raised, and the mixture was reacted at 130° C. for 1 hour to obtain a reaction product (a) as a yellow solid slurry. By using the reaction product (a) thus obtained, a solid catalyst component was prepared in the same manner as in Example 7(1). The Ti content thereof was 2.6% by weight.

In the same manner as in Example 1(2), polymerization of propylene was conducted, whereby the catalyst efficiency CE=22500 g-PP/g-Cat, the polymerization activity K=750, $\rho B$=0.43 g/cc, II=96.8% and MFI=6.3.

The particle size distribution of the polymer thus obtained was such that the polymer having a particle size of from 150 to 400 $\mu$m constituted 99% of the total powder, and the amount of fine powder of 100 $\mu$m or less was 0.5%.

EXAMPLE 9

A solid catalyst component was prepared in the same manner as in Example 8 except that 3.7 g of Ti(OC$_4$H$_9$)$_4$ was used as the titanium compound and the amount of purified toluene added was changed to 51 ml in Example 8. The Ti content thereof was 2.9% by weight.

Polymerization of propylene was conducted in the same manner as in Example 1(2), whereby the catalyst efficiency CE=21000 g-PP/g-Cat, the polymerization activity K=700, $\rho B$=0.41 g/cc, II=97.0% and MFI=5.4.

The particle size distribution of the polymer was such that the polymer having a particle size of from 200 to 500 $\mu$m constituted 99% of the total powder, and the amount of fine powder of 100 $\mu$m or less was 0.1% by weight.

EXAMPLE 10

A solid catalyst component was prepared in the same manner as in Example 8 except that 5 g of Ti(OC$_2$H$_5$)$_4$ was used as the titanium compound and the amount of purified toluene added was changed to 62 ml in Example 8. The Ti content thereof was 2.7% by weight.

Polymerization of propylene was conducted in the same manner as in Example 1(2) whereby the catalyst efficiency CE=22500 g-PP/g-Cat, the polymerization activity K=750, $\rho B$=0.43 g/cc, II=97.0% and MFI=7.3.

The particle size distribution was such that the polymer having a particle size of from 350 to 600 $\mu$m constituted 99% of the total amount, and the amount of fine powder of 100 $\mu$m or less was 0.3% by weight.

EXAMPLE 11

In the same manner as in Example 7(1), 5 g of commercially available Mg(OC$_2$H$_5$)$_2$, 7.4 g of Ti(OC$_4$H$_9$)$_4$ and a toluene solution of 8.2 g of phenol were mixed at room temperature, then heated under stirring and reacted at 110° C. for 1 hour and further at 130° C. for 1 hour. During the reaction, distillation of ethanol was observed.

Then, 4.6 g of tetraethoxysilane was added at 130° C., and the mixture was reacted at 130° C. for 1 hour to obtain a reaction product (a) as a yellow solid slurry.

To the reaction product (a) thus obtained, 87 ml of purified toluene was added, and the mixture was cooled to −20° C. Then, 25 g of TiCl$_4$ was added. After the addition, the temperature was gradually raised, and after the temperature reached 110° C., 1.3 g of ethyl benzoate was added thereto, and the mixture was maintained at 110° C. for 1 hour. Then, the product was washed with purified toluene to obtain a solid product.

Then, 82 g of TiCl$_4$ and 1.3 g of ethyl benzoate were added to the solid product thus obtained, and the solid product was treated at 80° C. for 1 hour.

Then, the product was washed with purified toluene at room temperature to obtain a solid catalyst component. The Ti content thereof was 2.8% by weight.

Polymerization of propylene was conducted in the same manner as in Example 1(2), whereby the catalyst efficiency CE=31500 g-PP/g-Cat, the polymerization activity K=1050, $\rho B$=0.45 g/cc, II=96.5% and MFI=5.8.

The particle size distribution of the polymer thus obtained was such that the polymer having a particle size of from 150 to 350 $\mu$m constituted 99% of the total powder, and the amount of fine powder of 100 $\mu$m or less was 0.3%.

EXAMPLE 12

A reaction product (a) was prepared in the same manner as in Example 11 except that 6.5 g of n-butanol was used instead of phenol and 8.8 g of tetraphenoxysilane was used as the silicon compound in Example 11.

By using the reaction product (a), a solid catalyst component was prepared in the same manner as in Example 7(1) except that the amount of purified toluene added was changed to 175 ml. The Ti content thereof was 2.6% by weight.

Polymerization of propylene was conducted in the same manner as in Example 1(2), whereby the catalyst efficiency CE=21300 g-PP/g-Cat, the polymerization activity K=710, $\rho B$=0.40 g/cc, II=97.2% and MFI=4.5.

The particle size distribution of the polymer was such that the polymer having a particle size of from 150 to 350 $\mu$m constituted 98% of the total powder, and the amount of fine powder of 100 $\mu$m or less was 0.8%.

EXAMPLE 13

A solid catalyst component was prepared in the same manner as in Example 11 except that 5 g of Ti(OC$_2$H$_5$)$_4$ was used as the titanium compound and the amount of purified toluene added was changed to 62 ml in Example 11. The Ti content thereof was 2.7% by weight.

Polymerization of propylene was conducted in the same manner as in Example 1(2), whereby the catalyst efficiency CE=30000 g-PP/g-Cat, the polymerization activity K=1000, $\rho B$=0.43 g/cc, II=97.0% and MFI=6.5.

The particle size distribution of the polymer was such that the polymer having a particle size of 200 to 500 $\mu$m constituted 98% of the total powder, and the amount of fine powder of 100 $\mu$m or less was 0.1%.

EXAMPLE 14

A solid catalyst component was prepared in the same manner as in Example 11 except that 8.8 g of tetraphenoxysilane was used as the silicon compound and the amount of purified toluene added was changed to 58 ml in Example 11. The Ti content thereof was 2.5% by weight.

Polymerization of propylene was conducted in the same manner as in Example 1(2), whereby the catalyst efficiency CE=28500 g-PP/g-Cat, the polymerization activity K=950, $\rho B$=0.43 g/cc, II=96.7% and MFI=6.7.

The particle size distribution of the polymer was such that the polymer having a particle size of from 200 to 400 $\mu$m constituted 98% of the total powder, and the amount of fine powder of 100 $\mu$m or less was 0.2%.

EXAMPLE 15

(1) Prepolymerization of propylene

Into a 1 liter autoclave, 300 ml of purified n-hexane, 1.0 mmol of triethylaluminum, 0.3 mmol of methyl p-methyl benzoate and 1.5 g of the solid catalyst component obtained in Example 1(1) were introduced under a nitrogen atmosphere at room temperature. Then, prepolymerization was conducted at 25° C. for 5 minutes by supplying propylene. The prepolymerized catalyst component thus obtained contained 3.5 g of polypropylene.

(2) Main polymerization of propylene

In the same manner as in Example 1(2), 1.0 mmol of triethylaluminum, 0.3 mmol of methyl p-methyl benzoate, 1.0 kg/cm$^2$ of H$_2$ and 700 g of liquefied propylene were charged into a 2 liter autoclave. Then, the prepolymerized catalyst component obtained in the above step (1) was added in an amount of 15 mg as the solid catalyst component. Then, the polymerization was conducted at 70° C. for 1 hour. Thereafter, excess propylene was purged to obtain 315 g of powder polypropylene. The catalyst efficiency CE was 21000 g-PP/g-Cat, and the polymerization activity K was 700. The bulk density $\rho B$ was 0.47 g/cc, II was 97.2% and MFI was 7.5.

The particle size distribution of the polymer thus obtained was very narrow such that the polymer having particle size of from 250 to 500 $\mu$m constituted 99% of the total powder, and the amount of fine powder of 100 $\mu$m or less was 0%.

EXAMPLE 16

(1) Prepolymerization of propylene

In the same manner as in Example 15(1). 60 ml of purified n-hexane, 3.6 mmol of triethylaluminum and 3.0 g of the solid catalyst component obtained in Example 4(1) were introduced into a 1 liter autoclave. Then, prepolymerization was conducted at 25° C. for 3 minutes by supplying propylene.

The prepolymerized catalyst component thus obtained contained 6.2 g of polypropylene.

(2) Main polymerization of propylene

In the same manner as in Example 15(2), polymerization of propylene was conducted, whereby the catalyst efficiency CE=20000 g-PP/g-Cat, the polymerization activity K=670, II=97.6%, $\rho B$=0.48 g/cc and MFI=6.8.

The particle size distribution of the polymer was such that the polymer having a particle size of from 177 to 500 μm constituted 95% of the total powder, and the amount of fine powder of 100 μm or less was 0%.

EXAMPLE 17

Polymerization of propylene was conducted in the same manner as in Example 15(2), the pretreated catalyst component obtained in Example 15(1) was used after washing with purified n-hexane The catalyst efficiency CE=19500 g-pp/g-Cat, the polymerization activity K=650, II =97.5%, ρB=0.47 g/cc and MFI=7.0.

The particle size distribution of the polymer thus obtained was substantially the same as in Example 15(2).

EXAMPLE 18

Polymerization of propylene was conducted in the same manner as in Example 15(2) by using the solid catalyst component obtained in Example 1(1). The catalyst efficiency CE=18000 g-pP/g-Cat, the polymerization activity K=600, II=94.5%, ρB=0.42 g/cc, MFI=6.6.

The particle size distribution of the polymer thus obtained was such that the polymer having a particle size of from 250 to 500 μm constituted 97% of the total powder, and the amount of fine powder 100 μm or less was 0.1%.

COMPARATIVE EXAMPLE 1

5 g of commercially available Mg(OC$_2$H$_5$)$_2$ and 7.4 g of Ti(OC$_4$H$_9$)$_4$ were reacted at 130° C. for 2 hours to obtain a liquid product.

This liquid product was dissolved in 87 ml of purified toluene, then cooled to $-20°$ C., and 41 g of TiCl$_4$ was added thereto at $-20°$ C. Precipitation was observed at the same time as the addition of TiCl$_4$, and the system remained to be in a slurry form.

The rest of the operation was conducted in the same manner as in Example 1(1) to obtain a solid catalyst component.

By using this solid catalyst component, polymerization of propylene was conducted in the same manner as in Example 1(2) to obtain a polymer.

The particle size distribution of the polymer thus obtained was very wide such that the polymer having a particle size of from 250 to 2000 μm constituted 66% of the total powder, and the amount of fine powder of 100 μm or less was as large as 12%.

COMPARATIVE EXAMPLE 2

(1) Preparation of catalyst component (A)

20 100 ml of purified n-heptane, 2.26 g of commercially available Mg(OC$_2$H$_5$)$_2$ and 0.67 g of Ti(OC$_4$H$_9$)$_4$ were mixed, and heated under stirring, and reacted at 80° C. for 2 hours to obtain a solid reaction product. Then, 0.59 g of ethyl benzoate was added thereto, and the reaction was conducted 98° C. for 1 hour. Then, 45 ml of TiCl$_4$ was dropwise added thereto at room temperature, and the mixture was heated and reacted at 98° C. for 2.5 hours. Then, the supernatant was withdrawn at 80 ° C., and the product was thoroughly washed with purified n-heptane to obtain 2.2 g of a solid catalyst component. The amount of Ti supported thereon was 3.4% by weight.

(2) Polymerization of propylene

Polymerization of propylene was conducted in the same manner as in Example 1(2), whereby the catalyst efficiency CE=3000 g-PP/g-Cat, the polymerization activity K=100, II=91.7%, MFI=10.5 and ρB=0.26.

Thus, the polymerization activity, stereo regularity and bulk density were all low.

The particle size distribution of the polymer thus obtained was very wide such that the polymer having a particle size of from 250 to 2000 μm constituted 80% of the total powder, and the amount of fine powder of 100 μm or less was 1.5%.

According to the present invention, an α-olefin polymer having excellent stereo regularity and granularity can be obtained with high polymerization activities. Thus, the present invention is very useful from the industrial point of view.

We claim:

1. A method for producing an olefin polymer, which comprises polymerizing or copolymerizing olefins in the presence of a catalyst consisting essentially of:

(A) a solid catalyst component obtained by thermally reacting (a$_1$) a magnesium compound of the formula Mg(OR$^1$)$_n$(OR$^2$)$_{2-n}$ wherein each of R$^1$ and R$^2$ which may be the same or different is an alkyl group, an aryl group or an aralkyl group, and n is $2 \geq n \geq 0$, (a$_2$) a titanium compound of the formula Ti(OR$^3$)$_4$ wherein R$^3$ is an alkyl group, an aryl group or an aralkyl group and (a$_3$) a silicon compound of the formula Si(OR$^4$)$_4$ wherein R$^4$ is an alkyl group, an aryl group or an aralkyl group, and contacting and treating (a) the resulting thermal reaction product with (b) a halogen-containing titanium compound and (c) an electron donative compound
of the formulas:

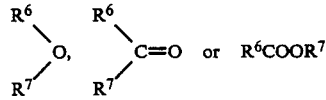

wherein each of R$^6$ and R$^7$ is a hydrocarbon group which may be substituted by an alkyoxy group, or R$^6$ and R$^7$ may be bonded to each other to form a cyclic group, wherein the thermal reaction product (a) contains a solid product comprising magnesium, titanium, silicon and OR group wherein R is an alkyl group, an aryl group or an aralkyl group, wherein the molar ratios relative to one mol of the magnesium compound (a$_1$) are:

| | |
|---|---|
| Mg(OR$^1$)$_n$(OR$^2$)$_{2-n}$] | 1 |
| Ti(OR$^3$)$_4$ | 0.05–4 |
| Si(OR$^4$)$_4$ | 0.1–5, | wherein the molar ratios relative to one mol of the magnesium compound in component (a) are:

| | |
|---|---|
| Halogen-containing titanium compound (b) | 0.1–100 |
| Electron donative compound (c) | 0.01–10, | and (B) an organometallic compound of a metal of Groups I–III of the Periodic Table,
wherein the molar ratio of titanium in the catalyst component (A): organometallic compound (B) is 1:3–500.

2. The method according to claim 1, wherein the thermal reaction of the maganesium compound (a$_1$), the titanium compound (a$_2$) and the silicon compound (a$_3$)

is conducted in the presence of (a₄) a compound of the formula R⁵OH wherein R⁵ is an alkyl group, an aryl group or an aralkyl group, and wherein the molar ratio of R⁵OH to one mol of the magnesium compound (a₁) is 0.1-5.

3. The method according to claim 1 wherein when the thermal reaction product (a) is treated with the halogen-containing titanium compound (b) and the electron donative compound (c), the system is brought to a homogeneous system prior to the formation of solid.

4. The method according to claim 1, wherein when the thermal reaction product (a) is treated with the halogen-containing titanium compound (b) and the electron donative compound (c), the product (a) and the compound (b) are contacted at a temperature of from −70° to 50° C. and then the compound (c) is treated therewith at a temperature of from 50° to 200° C., or the product (a) and the compounds (b) and (c) are contacted simultaneously at a temperature of from −70° to 50° C. and then treated at a temperature of from 50° to 200° C.

5. The method according to claim 2, wherein at least one of the magnesium compound (a₁), the titanium compound (a₂), the silicon compound (a₃) and the compound (a₄) of the formula R⁵OH contains an aryloxy group.

6. The method according to claim 1, wherein the treatment of the thermal reaction product (a) with the halogen-containing titanium compound (b) and the electron donative compound (c) is repeated at least twice.

7. The method according to claim 1, wherein the magnesium compound (a₁) of the formula Mg(OR¹)ₙ(OR²)₂₋ₙ is selected from the group consisting of a dialkoxy magnesium, a diaryloxy magnesium, a diaralkyloxy magnesium and an alkyloxyaryloxy magnesium.

8. The method according to claim 1, wherein the silicon compound (a₃) of the formula Si(OR⁴)₄ is group consisting of tetramethoxysilane, tetraethoxysilane, tetrapropoxysilane, tetrabutoxysilane, tetra(2-ethylhexoxy)silane, tetraphenoxysilane and tetra(p-methylphenoxy)silane.

9. The method according to claim 1, wherein the titanium compound (a₂) of the formula Ti(OR³)₄ is selected from the group consisting of Ti(OCH₃)₄, Ti(OC₂H₅)₄, Ti(OC₃H₇)₄, Ti(OC₄H₉)₄, Ti(OC₆H₅)₄ and Ti(OCH₂C₆H₅)₄.

10. The method according to claim 2, wherein the compound (a₄) of the formula R⁵OH is an alcohol selected from the group consisting of ethanol, isopropanol, propanol, butanol, isobutanol, hexanol, octanol, 2-ethylhexanol and benzyl alcohol, or a phenol selected from the group consisting of phenol, cresol, xylenol and butylphenol.

11. The method according to claim 1, wherein the halogen-containing titanium compound (b) is selected from the group consisting of titanium tetrachloride and a titanium halogen-alcoholate compound.

12. The method according to claim 2, wherein when a thermal reaction product (a) of the magnesium compound (a₁), the titanium compound (a₂), the silicon compound (a₃) and the compound (a₄) of the formula R⁵OH wherein at least one of the compounds (a₁), (a₂), (a₃) and (a₄) contains an aryloxy group, is treated with titanium tetrachloride (b) and a carboxylic acid ester (c) of the formula R⁶COOR⁷, components (a) and (b) are contacted at a temperature of from −70° to 50° C. and then component (c) is contacted at a temperature of from 50° to 200° C. so that the system is brought to a homogeneous system prior to the formation of solid.

13. The method according to claim 1, wherein the olefin is polymerized or copolymerized in the presence of an electron donative compound (C).

14. The method according to claim 1, wherein the magnesium compound (a₁) of the formula Mg(OR¹)ₙ(OR²)₂₋ₙ is selected from the group consisting of a dialkoxy magnesium, a diaryloxy magnesium, a diaralkyloxy magnesium and an alkyloxyaryloxy magnesium, wherein the silicon compound (a₃) of the formula Si(OR⁴)₄ is selected from the group consisting of tetramethoxysilane, tetraethoxysilane, tetrapropoxysilane, tetrabutoxysilane, tetra(2-ethylhexoxy)silane, tetraphenoxysilane and tetra(p-methylphenoxy)silane, wherein the electron donative compound (c) is of the formular R⁶COOR⁷ wherein R⁶ and R⁷ are as defined in claim 1, wherein the titanium compound (a₂) of the formula Ti(OR³)₄ is selected from the group consisting of Ti(OCH₃)₄, Ti(OC₂H₅)₄, Ti(OC₃H₇)₄, Ti(OC₄H₉)₄, Ti(OC₆H₅)₄ and Ti(OCH₂C₆H₅)₄, and wherein halogen-containing titanium compound (b) is selected from the group consisting of titanium tetrachloride and a titanium halogen-alcoholate compound.

15. The method according to claim 14, wherein the thermal reaction of the magnesium compound (a₁), the titanium compound (a₂) and the silicon compound (a₃) is conducted in the presence of (a₄) a compound of the formula R⁵OH wherein R⁵ is an alkyl group, an aryl group or an aralkyl group.

16. The method according to claim 15, wherein the compound (a₄) of the formula R⁵OH is an alcohol selected from the group consisting of ethanol, isopropanol, propanol, butanol, isobutanol, hexanol, octanol, 2-ethylhexanol and benzyl alcohol, or a phenol selected from the group consisting of phenol, cresol, xylenol and butylphenol.

17. The method according to claim 1, wherein the molar ratios relative to one mol of the magnesium compound (a₁) are:

| | |
|---|---|
| Mg(OR¹)ₙ(OR²)₂₋ₙ | 1 |
| Ti(OR³)₄ | 0.2-1 |
| Si(OR⁴)₄ | 0.2-2. |

18. The method according to claim 2, wherein the molar ratio of R⁵OH to one mol of the magnesium compound (a₁) is 1-3.

19. The method according to claim 1, which comprises polymerizing propylene or copolymerizing propylene and other olefins.

20. The method according to claim 2, wherein the molar ratios relative to one mol of the magnesium compound (a₁) are:

| | |
|---|---|
| Mg(OR¹)ₙ(OR²)₂₋ₙ | 1 |
| Ti(OR³)₄ | 0.2-1 |
| Si(OR⁴)₄ | 0.2-2. |

21. The method according to claim 14, wherein the molar ratios relative to one mol of the magnesium compound (a₁) are:

| | |
|---|---|
| Mg(OR¹)ₙ(OR²)₂₋ₙ | 1 |
| Ti(OR³)₄ | 0.2-1 |

-continued

| $Si(OR^4)_4$ | 0.2–2. |
|---|---|

22. The method according to claim 15, wherein the molar ratios relative to one mol of the magnesium compound ($a_1$) are:

| $Mg(OR^1)_n(OR^2)_{2-n}$ | 1 |
|---|---|
| $Ti(OR^3)_4$ | 0.2–1 |
| $Si(OR^4)_4$ | 0.2–2. |

23. The method according to claim 16, wherein the molar ratios relative to one mol of the magnesium compound ($a_1$) are:

| $Mg(OR^1)_n(OR^2)_{2-n}$ | 1 |
|---|---|
| $Ti(OR^3)_4$ | 0.2–1 |
| $Si(OR^4)_4$ | 0.2–2. |

24. The method according to claim 17, wherein the molar ratios relative to one mol of the magnesium compound ($a_1$) are:

| $Mg(OR^1)_n(OR^2)_{2-n}$ | 1 |
|---|---|

-continued

| $Ti(OR^3)_4$ | 0.2–1 |
|---|---|
| $Si(OR^4)_4$ | 0.2–2. |

25. The method according to claim 18, wherein the molar ratios relative to one mol of the magnesium compound ($a_1$) are:

| $Mg(OR^1)_n(OR^2)_{2-n}$ | 1 |
|---|---|
| $Ti(OR^3)_4$ | 0.2–1 |
| $Si(OR^4)_4$ | 0.2–2. |

26. The method according to any one of claims 1–4, 5, 8, 11, 13, 17, 20, 24 or 25, wherein the electron donative compound (c) is of the formula $R^6COOR^7$, wherein $R^6$ and $R^7$ are as defined in claim 1.

27. The method according to claim 26, wherein the electron donative compound (c) is ethyl acetate, methyl propionate, ethyl acrylate, ethyl oleate, ethyl stearate, ethyl phenylacetate, methyl benzoate, ethyl benzoate, propyl benzoate, butyl benzoate, methyl toluate, ethyl toluate, propyl toluate, butyl toluate, methyl ethylbenzoate, ethyl ethylbenzoate, ethyl xylenecarboxylate, methyl anisate, ethyl anisate, methyl ethoxybenzoate, ethyl ethoxybenzoate or ethyl cinnamate.

28. The method according to claim 26, wherein the electron donative compound (c) is ethyl benzoate.

* * * * *